United States Patent [19]

Sheu

[11] Patent Number: 5,718,484
[45] Date of Patent: Feb. 17, 1998

[54] WHEEL RIM COVER CLASP

[75] Inventor: Lih-Ching Sheu, Tainan Hsien, Taiwan

[73] Assignee: Kuan Hsieng Industrial Co., Ltd., Tainan City, Taiwan

[21] Appl. No.: 702,390

[22] Filed: Aug. 14, 1996

[51] Int. Cl.$^6$ ............................................. B60B 7/12
[52] U.S. Cl. ................................. 301/37.33; 301/37.34
[58] Field of Search ............................. 301/37.1, 37.31, 301/37.32, 37.33, 37.34, 37.35, 37.36, 37.42

[56] References Cited

U.S. PATENT DOCUMENTS

| | | | |
|---|---|---|---|
| 4,596,425 | 6/1986 | Hung | 301/37.42 X |
| 4,826,253 | 5/1989 | Shizai et al. | 301/37.36 |
| 5,108,157 | 4/1992 | Chen | 301/37.33 |

FOREIGN PATENT DOCUMENTS

| | | | |
|---|---|---|---|
| 3809480 | 10/1989 | Germany | 301/37.33 |
| 2258802 | 11/1987 | Japan | 301/37.33 |
| 3134303 | 6/1988 | Japan | 301/37.36 |

*Primary Examiner*—Russell D. Stormer
*Attorney, Agent, or Firm*—Panitch Schwarze Jacobs & Nadel, P.C.

[57] ABSTRACT

The wheel rim cover clasp of the invention herein is fabricated by bending and has a backing seat and, furthermore, formed above the backing seat is an insertion seat that provides for the inserting of the spring coils found on conventional wheel rim covers, and at the bend below the backing seat is a support base followed by a flexure to form a stop tab. Positioned on the backing seat, the support base and the stop tab is a slot and, furthermore, projecting from the interior surface of the trough formed by the insertion seat is a protrusion. The clasp is thereby enabled, following insertion into the mounting hole of the mounting base, to have an appropriate degree of tightness, while the inserted spring coil is enabled to be secured more stably.

2 Claims, 5 Drawing Sheets

WHEEL RIM COVER CLASP

BACKGROUND OF THE INVENTION

1. Field of the Invention

The invention herein relates to a kind of wheel rim cover clasp, a kind of wheel rim cover clasp that can be conveniently fastened to the mounting hole of the mounting base on the wheel rim cover, while also providing a spring coil for more stable insertion effectiveness.

2. Description of the Related Art

In the peripheral design of conventional compact car tires, to cosmetically cover the unattractive steel wheel, wheel rim covers are installed at the juncture of the wheel and the tire. Conventional wheel rim covers, as indicated in FIG. 1, are attractive externally and round in shape, with engraved holes (12) utilized on the cap surface (11) of the wheel rim cover (1) near the rim to enhance aesthetic appearance and provide heat dissipation, and on the rear side of the cap surface (11), as indicated in FIG. 2, is a clasp structure that mainly consists of a ring of mounting bases (2) and clasps (21) positioned at suitable intervals apart; each clasp (21) is surrounded in between by spring coils (3) and the clasps (21) of the wheel rim cover (1) are utilized to push downwards for insertion against the outer circumference of the steel wheel to achieve effective embellishment.

Regarding the structural portion of the wheel rim cover, the inventor of the invention herein has designed the structure shown in FIG. 3, which mainly consists of a mounting hole (43) on a mounting base (42) and, at the same time, the clasp (5) and the wheel rim cover (4) are separately formed with a hook section (51) formed at one end, and the other end, after bending a support section (52), a resistance arm (53) is formed that can be inserted into the mounting hole (43) of the aforesaid mounting base (42), enabling in terms of assembly and as indicated in FIG. 4, the resistance arm (53) of the clasp (5) to be inserted into the mounting hole (43) and, furthermore, held to the mounting base (42); and as the support section (52) is inserted into the mounting hole (43), and after moving the clasp (5) along the same linear axis as the mounting base (42), the spring coil can be inserted into the hook section (51) of the clasp (5) and thereby form a completed wheel rim cover.

In this kind of discrete clasp and mounting base design, since the clasps can be separately packaged and does not take up packaging material on the wheel rim cover. However, although the aforesaid design offers the advantage of saving more packaging material than non-discrete designs, the stability and convenience of the insertion at the mounting hole (43) and the hook section (51) is a disadvantageous; since the hook section (51) and the mounting hole (43) are separately conjoined to the spring coil and resistance arm (53), as well as the support section (52), components can be dislodged during the assembly process.

SUMMARY OF THE INVENTION

The objective of the invention herein is to provide an improved wheel rim cover clasp that is fabricated by bending and has a backing seat and, furthermore, formed above the backing seat is an insertion seat and at the bend below is a support base followed by a flexure that forms a stop tab. On the backing seat, the support base and the stop tab is a slot and, furthermore, projecting from the interior lower surface of the trough formed by the insertion seat is a protrusion.

BRIEF DESCRIPTION OF THE DRAWINGS

Additional features and advantages of the invention herein will become apparent in the following detailed description of the preferred embodiments, with reference to the accompanying drawings, wherein.

DETAILED DESCRIPTION OF THE PREFERRED EMBODIMENTS

In the detailed description of the preferred embodiments of the invention herein, similar elements are indicated by the same reference numbers throughout the disclosure.

Figure 1:
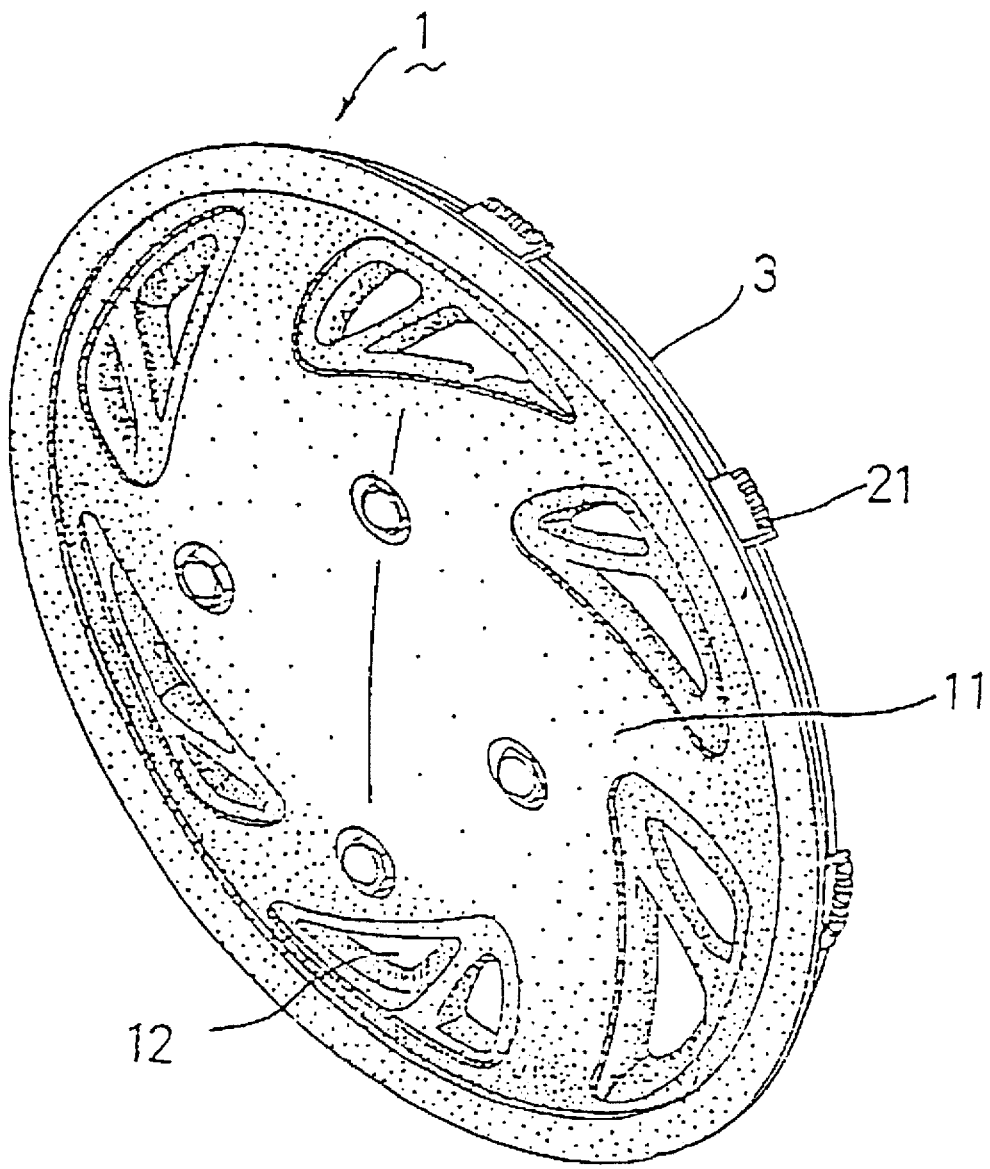
FIG. 1 is an isometric drawing of a conventional wheel rim cover.
Figure 2:
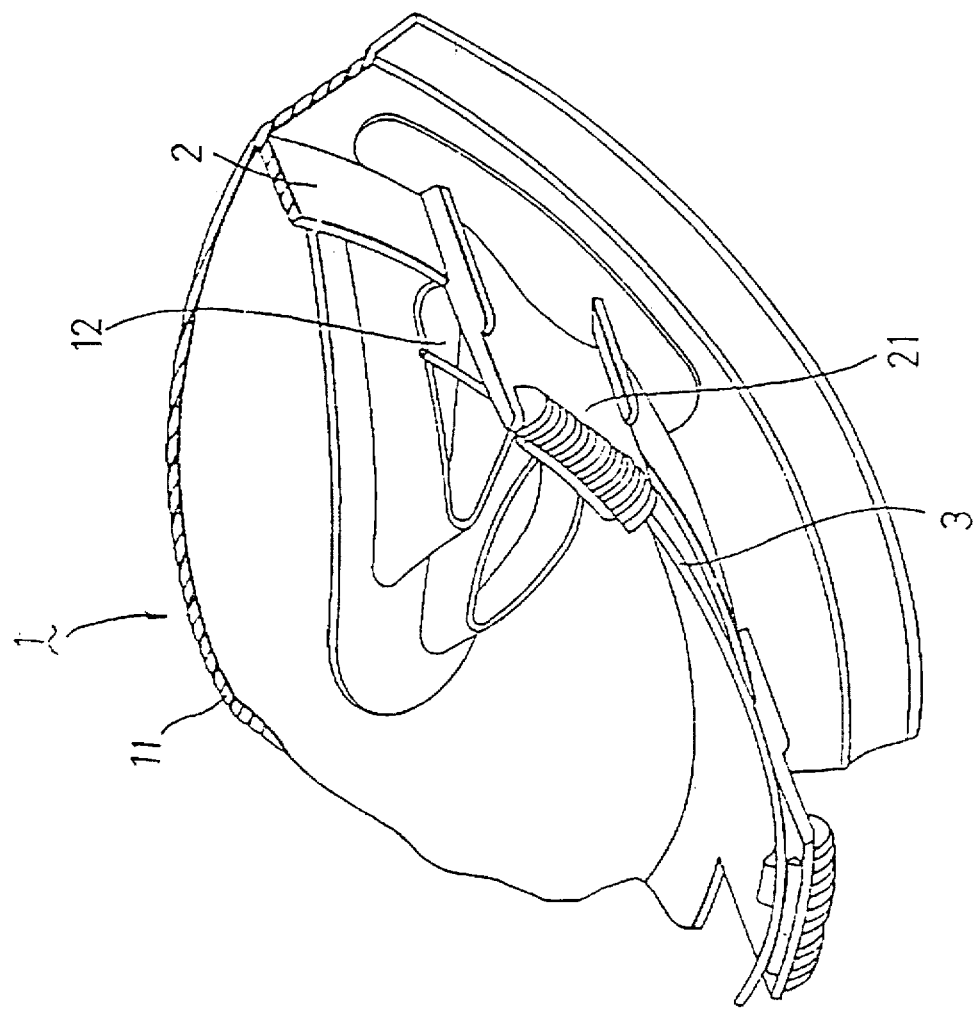
FIG. 2 is an isometric drawing of a conventional wheel rim cover structure.
Figure 3:
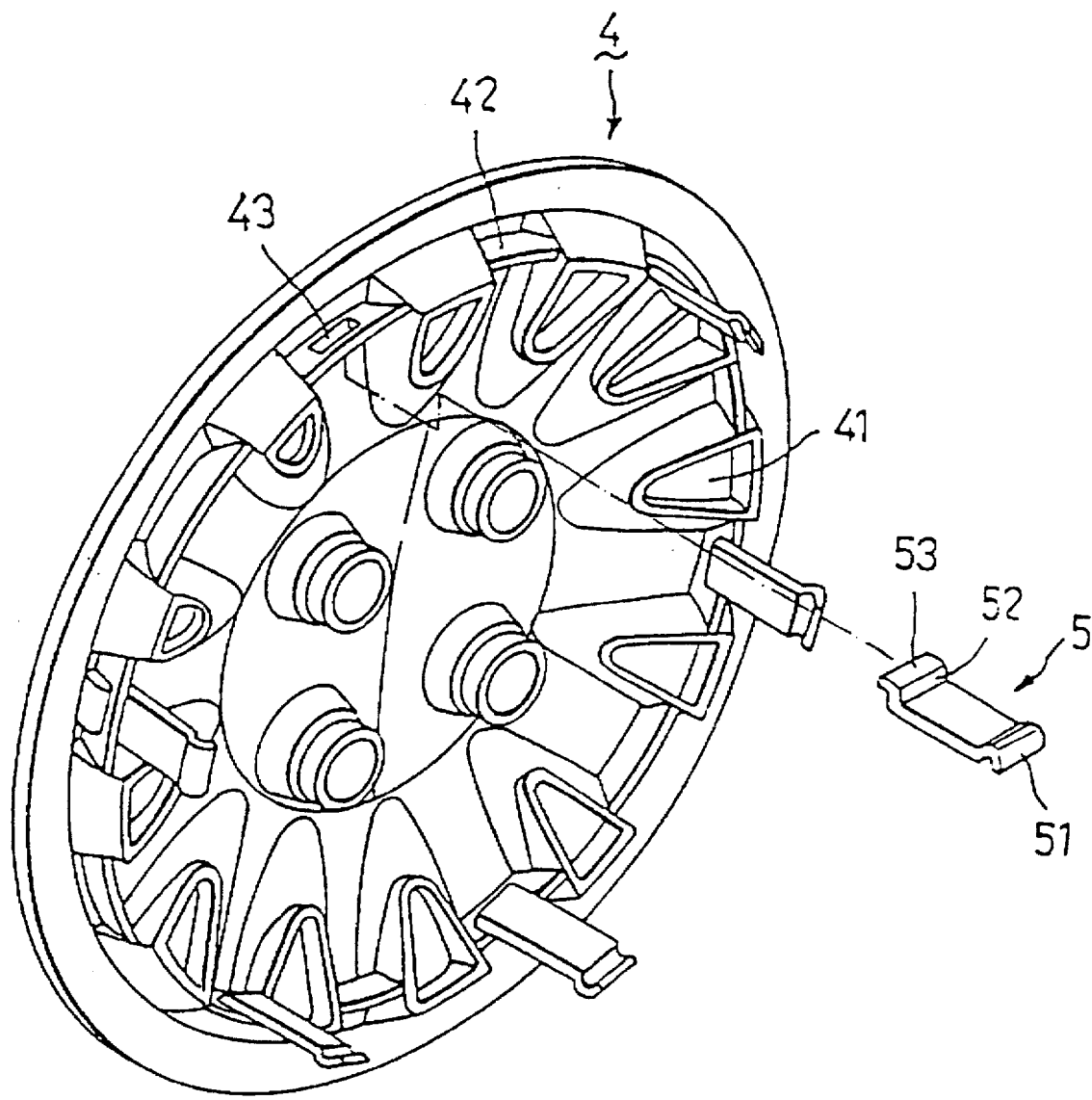
FIG. 3 is an isometric drawing of a conventional knock down wheel rim cover structure.
Figure 4:
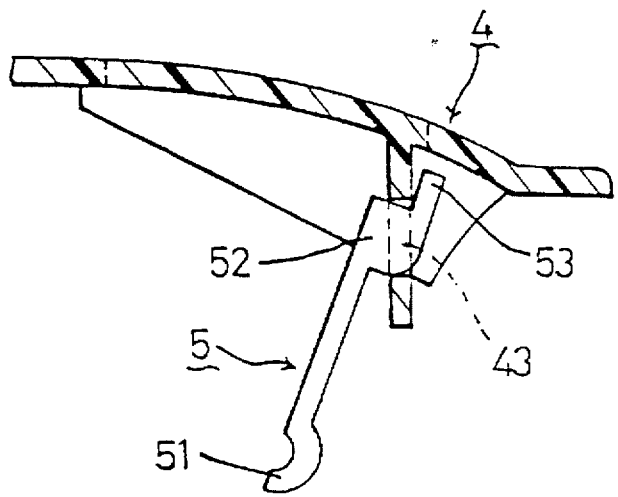
FIG. 4 is a cross-sectional drawing of a conventional knock down wheel rim cover structure.
Figure 5:
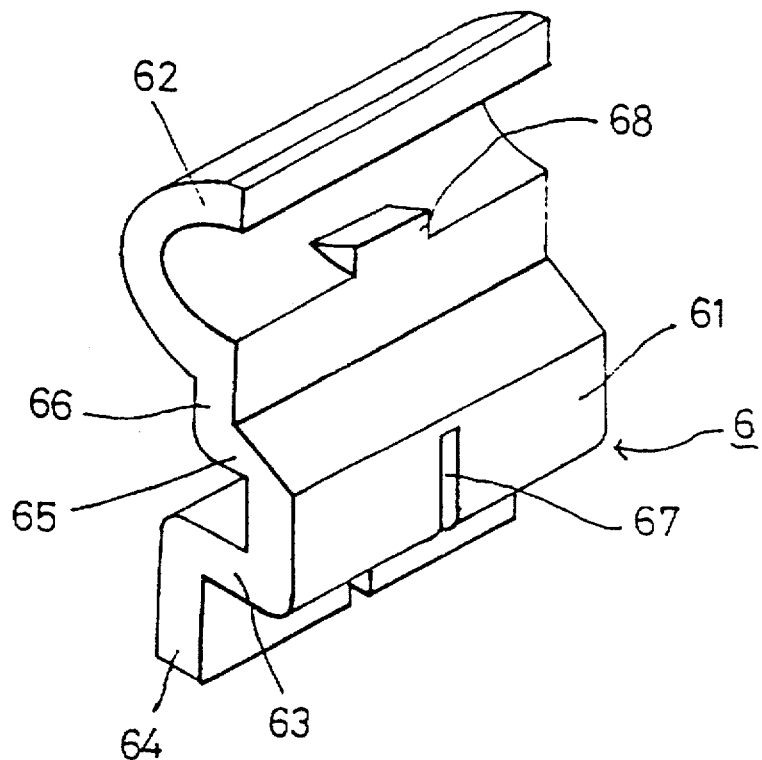
FIG. 5 is an isometric drawing of the preferred embodiments of the invention herein.

Referring to FIG. 5, the clasp (6) in the preferred embodiments of the invention herein is fabricated by bending and has a backing seat (61) and, furthermore, formed above the backing seat (61) is an insertion seat (62) that provides for the inserting of the spring coils found on conventional wheel rim covers, and at the bend below the backing seat (61) is a support base (63) followed by a flexure to form a stop tab (64). Positioned in between the backing seat (61) and the insertion seat (62) is a fastener base (65) that is bent towards the support base (63), and in between the support base (63) and the aforesaid insertion seat (62) is a connection base (66). Positioned approximately midway amidst the backing seat (61), the support base (63) and the stop tab (64) is a slot (67) and, furthermore, projecting from the interior lower aspect of the trough formed by the insertion seat (62) is a protrusion (68).

Figure 6:
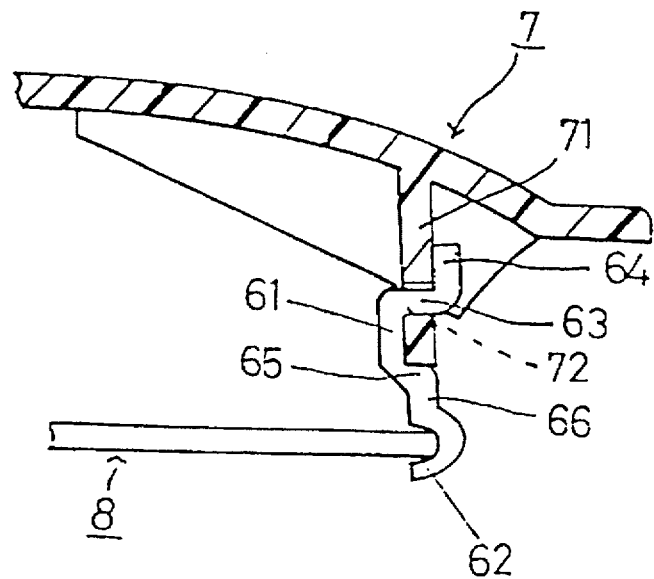
FIG. 6 is a cross-sectional application drawing of the preferred embodiments of the invention herein.
Figure 7:
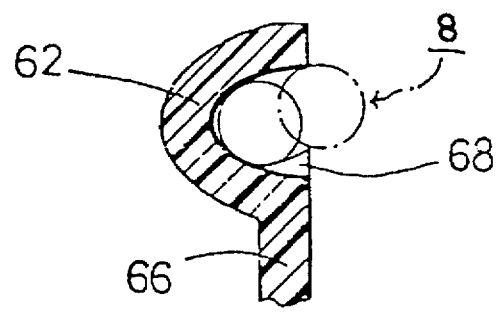
FIG. 7 is a cross-sectional application drawing of the preferred embodiments of the invention herein.

Referring to FIG. 6, assembly consists of first applying inward pressure to the stop tab (64) of the clasp (6), followed by full insertion through the mounting hole (72) of the mounting base (71), which thereby enables the insertion of the support base (63) into the aforesaid mounting hole (72), at which time, since the width of the stop tab (64) is slightly larger than the width of the mounting hole (72), therefore, the clasp (6) now inserted and held in the mounting hole (72) cannot be dislodged, and then later toggles the backing seat (61), causing the backing seat (61) to be fixed against the mounting base (71), and also causing the fastener base (65) to be inserted into the edge of the mounting base (71), such that after assembly, the clasp (6) is maintained in a state of mutual alignment with the mounting base (71). Furthermore, following the installation of the spring coil (8) and then after inserting into the insertion seat (62), as indicated by the hypothetical line in FIG. 7, since the path of line exceeds and is lower than the aforementioned protrusion (68), the slightest application of force is sufficient enough to achieve insertion past the aforesaid protrusion and securing into position within the area of the insertion recess.

The design of the invention herein enables the clasp (6), following insertion into the mounting hole (72) of the mounting base (71), to have an appropriate degree of tightness that is difficult to loosen, while also enabling the more stable securing of the inserted spring coil (8).

While the invention herein has been described in relation to what is considered the most practical and preferred embodiments, the invention herein shall not limited to the disclosed embodiments in that the intention is to cover the various interpretations included within the principles and scope of the broadest interpretations and equivalent configurations thereof.

What is claimed is:

1. A wheel rim cover clasp comprising a backing seat having a first end and a second end, an insertion seat extending from the first end of the backing seat, the insertion seat being bent away from the backing seat and having a free end, the free end including a trough having an interior surface, a support base extending from the second end of the backing seat, a stop tab extending from the support base in a direction away from the backing seat, a slot extending through the backing seat, the support base and the stop tab to separate the support base and the stop tab into two sections that are moveable with respect to each other, and a protrusion projecting from the interior surface of the trough in the insertion seat.

2. The wheel rim cover clasp as recited in claim 1 wherein a fastener base is positioned between the backing seat and the insertion seat, the fastener base being bent towards the support base, and a connection base is positioned between the support base and the insertion seat.

* * * * *